US009717269B2

(12) United States Patent
Drew et al.

(10) Patent No.: US 9,717,269 B2
(45) Date of Patent: Aug. 1, 2017

(54) THERMALLY INHIBITED FLOURS FOR IMPROVED RETORT EFFICIENCY

(71) Applicants: Leslie Drew, North Brunswick, NJ (US); Yadunandan L. Dar, Somerset, NJ (US)

(72) Inventors: Leslie Drew, North Brunswick, NJ (US); Yadunandan L. Dar, Somerset, NJ (US)

(73) Assignee: Corn Products Development, Inc., Westchester, IL (US)

(*) Notice: Subject to any disclaimer, the term of this patent is extended or adjusted under 35 U.S.C. 154(b) by 0 days.

(21) Appl. No.: 14/674,326

(22) Filed: Mar. 31, 2015

(65) Prior Publication Data

US 2016/0007636 A1 Jan. 14, 2016

Related U.S. Application Data

(62) Division of application No. 13/850,010, filed on Mar. 25, 2013, now abandoned.

(51) Int. Cl.
| | |
|---|---|
| *A21D 2/00* | (2006.01) |
| *A23L 29/225* | (2016.01) |
| *A23L 3/10* | (2006.01) |
| *A23L 29/212* | (2016.01) |
| *A23L 7/10* | (2016.01) |
| *A23L 23/00* | (2016.01) |

(52) U.S. Cl.
CPC ............... *A23L 29/225* (2016.08); *A23L 3/10* (2013.01); *A23L 7/198* (2016.08); *A23L 23/00* (2016.08); *A23L 29/212* (2016.08); *A23V 2002/00* (2013.01)

(58) Field of Classification Search
None
See application file for complete search history.

(56) References Cited

U.S. PATENT DOCUMENTS 5,433,966 A * 7/1995 Wolt ................. A21D 6/003
426/520
6,221,420 B1 * 4/2001 Thomas ............ A21D 2/186
426/573

FOREIGN PATENT DOCUMENTS

| EP | 0154039 A1 | 11/1985 |
| EP | 2783583 | 10/2014 |
| WO | WO 9504082 A2 | 2/1995 |
| WO | WO9748290 A1 | 12/1997 |

OTHER PUBLICATIONS

FO What It Means—How to Calculate—How to Use It for Adjustment, Control and Validation of Moist-Heat Sterilization Process—Fedegari Jun. 27, 2014.

* cited by examiner

*Primary Examiner* — Patricia George
(74) *Attorney, Agent, or Firm* — Karen Kaiser; Jason Grauch

(57) ABSTRACT

The application relates to a process comprising retorting a food product comprising thermally inhibited flour for a time from about 15 minutes to about 80 minutes to achieve a $F_0$ value of at least 10.

9 Claims, No Drawings

THERMALLY INHIBITED FLOURS FOR IMPROVED RETORT EFFICIENCY

INTRODUCTION

Canned and jarred food products are often heated for cooking and sterilization in a retort. Exposure time at sufficiently high temperatures is required to ensure food safety. This is usually characterized by a $F_0$ value. The larger the required $F_0$ value for food safety, the longer the time the food needs to be exposed to the required retort processing temperature. This is a limiting factor in capacity utilization for companies that manufacture retorted food products. Further, heating at high temperatures, particularly for a long time, is often deleterious to the food product, changing its organoleptic properties, such as taste, aroma, color, or texture.

One of the ingredients used in many retorted products is flour. Flour provides viscosity and has a unique mouth feel that has become associated with, for example, creamy soups, home style gravies, and sauces. Others have tried to increase the efficiency of retorting to reduce the time-temperature profile necessary to ensure food safety, for example by replacing flour with starch. These changes are not fully acceptable for a number of reasons such as changes in appearance, taste, or texture and the complexity resulting from substituting starch for flour.

SUMMARY

In one aspect, the application provides a process comprising retorting a food product comprising thermally inhibited flour for a time from about 15 minutes to about 80 minutes to achieve a $F_0$ value of at least 10.

DETAILED DESCRIPTION

In one aspect, the application provides a process comprising retorting a food product comprising thermally inhibited flour for a time from about 15 minutes to about 80 minutes to achieve a $F_0$ value of at least 10.

In one embodiment, the time is from about 50 minutes to about 70 minutes.

In one embodiment, the thermally inhibited flour comprises from about 0.1 wt % to about 20 wt % of the total weight of the retorted food product.

In another embodiment, the thermally inhibited flour comprises from about 5% (wt/wt) to about 7% (wt/wt) of the total weight of the retorted food product.

In one embodiment, the time to achieve a $F_0$ value of at least 10 is at least 10% less than the time to achieve a $F_0$ value of at least 10 with a flour which was not thermally inhibited.

In another embodiment, the time to achieve a $F_0$ value of at least 10 is at least 20% less than the time to achieve a $F_0$ value of at least 10 with a flour which was not thermally inhibited.

In another embodiment, the time to achieve a $F_0$ value of at least 10 is at least 30% less than the time to achieve a $F_0$ value of at least 10 with a flour which was not thermally inhibited.

In one embodiment, the thermally inhibited flour comprises from about 10 wt % to about 100 wt % of the starch and/or flour in the food product.

In another embodiment, the thermally inhibited flour is the only starch or flour in the food product.

In one embodiment, the thermally inhibited flour has replaced an equivalent amount of the same flour which was not thermally inhibited on a 1:1 wt/wt basis in the retorted food product.

In one embodiment, the retorted food product is soup, sauce, gravy, or beverage.

In one aspect, the application provides a process comprising:
  a) substituting thermally inhibited flour for a larger amount of flour which was not thermally inhibited on a less than 1:1 wt/wt basis in a food product; and
  b) retorting the food product comprising thermally inhibited flour for a time from about 15 minutes to about 80 minutes to achieve a $F_0$ value of at least 10.

In one embodiment, the amount of the thermally inhibited flour is in an amount of at least 5% (wt/wt) less than the flour which was not thermally inhibited.

In another embodiment, the amount of the thermally inhibited flour is in an amount of at least 10% (wt/wt) less than the flour which was not thermally inhibited.

In another embodiment, the amount of the thermally inhibited flour is in an amount of at least 15% (wt/wt) less than the flour which was not thermally inhibited.

In one embodiment, the thermally inhibited flour comprises from about 10 wt % to about 100 wt % of the starch and/or flour in the food product.

In another embodiment, wherein the thermally inhibited flour is the only starch or flour in the food product.

In one embodiment, the thermally inhibited flour comprises from about 0.1 wt % to about 20 wt % of the total weight of the retorted food product.

In one embodiment, the retorted product of a process comprising retorting a food product comprising thermally inhibited flour for a time from about 15 minutes to about 80 minutes to achieve a $F_0$ value of at least 10.

In one embodiment, the retorted product of a process comprising:
  a) substituting thermally inhibited flour for a larger amount of flour which was not thermally inhibited on a less than 1:1 wt/wt basis in a food product; and
  b) retorting the food product comprising thermally inhibited flour for a time from about 15 minutes to about 80 minutes to achieve a $F_0$ value of at least 10.

It has now been discovered that use of thermally inhibited flour may reduce the amount of time needed to achieve a required $F_0$ value, increasing the efficiency of the retort process without detrimentally affecting the organoleptic properties of the retorted food. The flour is processed by a thermal treatment. The application also includes the improved retorted food products produced using such thermally inhibited functional flours.

In one embodiment, the application provides a method of preparing a retorted food product that includes retorting a food product comprising thermally inhibited flour for a time to achieve $F_0$. In such methods the time to achieve $F_0$ can be at least 10% less than a time to achieve $F_0$ with a flour which is not thermally inhibited. Alternatively in such methods, the amount of the thermally inhibited flour in the food product can be at least 5% less wt/wt than the amount of flour which is not thermally inhibited to provide the same viscosity at $F_0$.

This application pertains to the use of a thermally inhibited flour to reduce the amount of time needed to achieve a required $F_0$ value, increasing the efficiency of the retort process without detrimentally affecting the organoleptic properties of the retorted food. The thermally inhibited flour is processed by a dehydration and heat treatment process to obtain a flour with a non-cohesive texture and a viscosity profile similar that those of a chemically inhibited flour. The application also includes the improved retorted food products produced using such thermally inhibited flours.

The amount of heat required to destroy microorganisms in a product can be determined through thermal death time (TDT) tests. TDT tests involve heating a known amount of microorganisms in a buffer solution or food at several temperatures and for several time intervals at each temperature. The results from the TDT tests are used to calculate D- and z-values. These values are used to define the heat resistance of specific microorganisms of concern. In conducting TDT tests, the thermal characteristics (D- and z-values) of the microorganisms can be determined. The D-value is defined as the time at a particular temperature required to reduce a known number of microorganisms by 90% or to result in a 1-log reduction in the number of microorganisms. By determining the D-values at various temperatures, a z-value can be determined from the slope of the line that results from plotting the log of D-values versus temperature. The z-value, indicative of the change in the death rate based on temperature, is the number of degrees between a 10-fold change (1 log cycle) in an organism's resistance. In order to compare thermal processes calculated for different temperatures, a standard $F_0$ value is assigned for each product.

This $F_0$ value is the time in minutes (at a reference temperature of 121° C. and a z-value of 10° C.) to provide the appropriate spore destruction (minimum health protection or commercial sterility). Using the reference value at 121° C. and the D- and z-values, the time for commerically sterility can be converted to other temperatures. Due to a variety of factors (e.g., influence of the food on the destruction of spores) different foods will have different $F_0$ values. The $F_0$ value varies between organisms and between the same organism in different food products.

The flours used in preparing the present application may be derived from any native source. A native flour is suitable. Also suitable are flours derived from a plant obtained by standard breeding techniques including crossbreeding, translocation, inversion, transformation, insertion, irradiation, chemical or other induced mutation, or any other method of gene or chromosome engineering to include variations thereof. In addition, flour derived from a plant grown from induced mutations and variations of the above generic composition which may be produced by known standard methods of mutation breeding are also suitable herein.

Typical sources for the flours of this application are cereals, tubers, roots, legumes and fruits. The native source can include corn (maize), pea, potato, sweet potato, banana, barley, wheat, rice, sago, amaranth, tapioca, arrowroot, canna, or sorghum, as well high amylopectin or high amylose varieties thereof.

In one embodiment, the flour is derived from wheat. In another embodiment, the wheat flour has an amylose content of at least 27% by weight of the starch. In yet another embodiment, the wheat flour has an amylose content of at least 40% by weight of the starch. In still another embodiment, the wheat flour is waxy wheat flour.

In one embodiment, the flour used in this application is derived from corn. In another embodiment, the corn flour has an amylose content of at least 50% by weight of the starch. In yet another embodiment, the corn flour has an amylose content of at least 70% by weight of the starch.

In one embodiment, the flour used comprises at least 5% protein and in another embodiment at least 10% protein, by weight of the flour. In one embodiment, the flour used comprises at least 1% lipid, and in another embodiment at least 3% lipid, by weight of the flour.

In another embodiment, the high amylose flour is extracted from a plant source having an amylose extender genotype (recessive or dominant). In another embodiment, the flour comprises starch containing less than 10% by weight amylopectin as determined by the butanol fractionation methodology. In yet another embodiment, the flour is derived from a plant breeding population, particularly corn, which is a genetic composite of germplasm selections and comprises at least 75% by weight amylose, and in one case at least 85% by weight amylose (i.e., normal amylose). In yet another embodiment, the flour comprises less than 10%, by weight of amylopectin, and in another embodiment less than 5%, amylopectin. In yet another embodiment, the flour comprises from about 8% to about 25% low molecular weight amylose. In a further embodiment, the flour is extracted from the grain of a starch bearing plant having a recessive amylose extender genotype coupled with numerous amylose extender modifier genes. Such plant is known and described in the art.

The flour is obtained from the native source using methods known in the art for producing flour, for example by dry milling. Other possible methods include, without limitation, wet grinding and separation or a combination of dry and wet procedures. One skilled in the art understands that the components of the flour may be manipulated; for example, the protein content of flour may be increased by known techniques, such as fine grinding and air classification.

In preparing the flour of this application it is necessary that the flour be processed under conditions which avoid or minimize gelatinization of the starch component of the flour so that the starch substantially retains its granular structure (e.g., at least 90 wt % of the flour retains its granular structure). Slight gelatinization may occur, but should be minimized. In one embodiment, there is substantially no gelatinization.

The flour may optionally be adjusted to a pH level effective to maintain the pH at a pH of at least 5 during the dehydration and heat treatment steps. On one embodiment the pH is in the neutral range from about 6 to about 8. In another embodiment the pH is in the basic or alkali range of at least 8.5. Adjusting the pH to a value of at least 6 or above may reduce or eliminate hydrolysis of the flour during these steps. Therefore, particularly if the dehydration step is thermal, adjustment of the pH may be done before the dehydration step. If the dehydration temperature is not at high temperatures (100° C. or higher), pH adjustment may be done after the dehydration step, or both before and after. In one aspect of the invention, the pH is not adjusted.

In one embodiment, the pH is adjusted to a value from about 6 to about 12, and in another embodiment the pH is from about 7 to about 9.5. While a pH higher than 12 may be used, such a pH will tend to increase browning of the flour during the thermally inhibited treatment and may cause other adverse reactions such as gelatinization. Therefore, pH adjustments to a pH no greater than 12 are typically most effective. In selecting the precise pH at which the flour will be thermally inhibited, the practitioner will select a balance between color formation and characteristics such as texture, stability, thickening ability and the like.

Adjustment of the pH may be accomplished by any method known in the art. In one embodiment, the pH is adjusted by slurrying the flour in water (e.g. 1.5 to 2 parts water to 1 part flour) or in an aqueous medium and raising the pH by the addition of any suitable base. After the pH of the flour has been brought into the desired pH range, the slurry may be dewatered and then dried, or dried directly, typically to a moisture content of from about 2% (wt/wt) to the equilibrium moisture content of the flour. It is known in the art that the equilibrium moisture content is dependent upon, inter alia, the source of the flour (e.g. potato, corn). This drying procedure is to be distinguished from the dehydration step in which the flour is dehydrated to a moisture content of less than 5%. In another embodiment, the pH is adjusted by spraying a solution of a base (alkali) onto the flour. Buffers, such as alkali carbonates or phosphates, may be used to maintain pH, if needed.

For food applications, a food grade base is used. Suitable food grade bases for use in the pH adjustment step of the process include, but are not limited to, salts of carbonates, hydroxides, and phosphates, including orthophosphates, together with any other base approved for food use under regulatory laws. Bases not approved for food use under these regulations may also be used, provided they can be washed from the flour so that the final product conforms to good manufacturing practices for food use. In one aspect of this invention, the food grade base is sodium carbonate.

The flour is dehydrated to less than about 5% (wt/wt) water content and in one aspect of the invention is dehydrated to anhydrous or substantially anhydrous conditions. As used herein, the term "substantially anhydrous" is intended to mean less than about 2% water content, in one embodiment less than about 1.5% water content, and in yet another embodiment less than about 1% (w/w) water. The dehydration may be accomplished by any means known in the art and includes thermal methods, and non-thermal methods such as using a hydrophilic solvent such as an alcohol (e.g. ethanol), freeze drying, vacuum drying, or using a desiccant. Non-thermal dehydration may improve the taste of the thermally-inhibited flour.

The dehydration step to remove moisture and obtain a substantially anhydrous flour may be carried out by a thermal dehydration procedure using a heating device for a time and temperature sufficient to reduce the moisture content to that desired. In one embodiment, the temperature used is about 125° C. or less and in another aspect is about 100° C. or less. In another embodiment, the temperature will range from about 80° C. to about 140° C. While the dehydration temperature can be lower than 80° C., a temperature of at least 80° C. will be more effective in removing moisture when using a thermal method.

The dehydration step may be conducted using any process or combination of processes which allows moisture to be removed. In one embodiment the dehydration step is conducted in a thin film of less than one inch, and in another in a thin film of less than half an inch. Typical procedures where starch is dehydrated are disclosed in U.S. Pat. No. 5,932,017 issued to Chiu et al. on Aug. 3, 1999 and U.S. Pat. No. 6,261,376 issued to Jeffcoat et al. on Jul. 17, 2001.

In an embodiment of this application, dehydration of the flour is carried out using a vacuum and, optionally in combination with a gas purge, while heating at an elevated temperature. The purge gas may be any inert gas including without limitation carbon dioxide or nitrogen and in one embodiment is nitrogen. In one embodiment, the purge option is used if the vacuum is insufficient to remove water vapor present in the system. In another embodiment, flour is vacuum dried to anhydrous or substantially anhydrous conditions in a fluidized bed reactor.

In another embodiment, the flour is dehydrated in a pressurized reactor at elevated temperatures and pressure. In one embodiment, the pressure is from about atmospheric to about 525 kPag, while in another embodiment the pressure is from about 145 kPag to about 515 kPag. In yet in another embodiment the vessel atmosphere is kept below the Limiting Oxygen Concentration (LOC) by use of a mixed nitrogen/oxygen gas stream and in yet a further embodiment, the oxygen is in the range of 8-12% by volume of the surrounding gas. The LOC is the maximum oxygen concentration at which a dust explosion is no longer possible in a dust/air/inert gas mixture.

The heat treatment step is performed by heating the dehydrated flour at a temperature of about 100° C. or greater for a time sufficient to inhibit the flour. When flour is subjected to heat in the presence of water, hydrolysis or degradation may occur. Hydrolysis or degradation will reduce the viscosity, change the texture typically by increasing cohesiveness, and results in increased color development. Therefore, the conditions for the dehydration should be chosen to minimize hydrolysis and degradation. In one aspect of the application, the flour is substantially anhydrous before reaching heat treatment temperatures, and in another aspect of the application the flour is substantially anhydrous throughout at least ninety percent of the heat treatment.

In one embodiment of this application, the oxygen concentration, i.e. moles oxygen/$m^3$, may be maintained at a certain level during the dehydration and/or the heat treatment steps. In one embodiment, maintaining an effective oxygen concentration of at least 6.5 moles/$m^3$ results in increased inhibition rates and a surprisingly reduced rate of color development resulting in improved organoleptic qualities, including color, taste, and odor. In another embodiment, the effective oxygen concentration is increased to at least 9 moles/$m^3$, in another to at least 12 moles/$m^3$, and in yet another to at least 25 moles/$m^3$. In one embodiment, increased oxygen concentration is achieved by using enriched oxygen gas (greater than the about 21% (v/v) oxygen content of air). This embodiment may be at ambient pressure or at higher pressure, as long as safety is maintained, and in one embodiment is at ambient pressure. In another embodiment, increased oxygen concentration is achieved by increasing the pressure of the gas above ambient.

The heat treatment may be conducted over a range of temperatures of at least 100° C. In one embodiment, the temperature will range from about 100 to about 200° C., in another embodiment from about 120 to about 180° C. and in yet another embodiment from about 150 to about 170° C.

The time for heat treatment in one embodiment is from about 0 to about 12 hours, in another embodiment is from about 0.25 to about 6 hours and in yet another embodiment is from about 0.5 to about 2 hours. The time for heat treatment is measured from the time the temperature stabilizes (the target temperature is reached) and therefore the heat treatment time may be zero if thermal inhibition occurs while such temperature is being reached. For example, if conducting the process in an apparatus which has a comparatively slow temperature ramp-up, once the flour has reached substantially anhydrous conditions, thermal inhibition will begin once dehydration has been achieved if the temperature is sufficiently high and may be complete before the apparatus reaches final temperature.

The heat-up (ramp) time may vary depending upon the equipment used, the process conditions, and the flour used. In one embodiment, it is desirable to have a short heat-up time to avoid color and adverse flavor formation in the resultant flour. In another embodiment, the heat-up time is less than 5 minutes and in another less than 1 minute. The dehydrating and/or heat treatment steps may be performed at normal pressures, under vacuum, or under pressure, and may be accomplished using any means known in the art. In one method, the gas used is pre-dried to remove any moisture.

The dehydration and heat treatment steps may be accomplished in the same apparatus or different apparatus. In one embodiment, the dehydrating and heat treatment steps are in the same apparatus and in another embodiment are continuous (not batch). The dehydration and heat treatment steps may be carried out in any apparatus (singular or plural). When the dehydration and heat treatment steps are carried out in an apparatus which is very efficient at removing moisture, the two steps may occur all but simultaneously. The two steps may both occur during ramp up of temperature. The dehydration step is typically conducted in an apparatus fitted with a means for moisture removal (e.g. a vent, vacuum, or a blower to sweep gas from the head-space of the apparatus, fluidizing gas) to substantially prevent moisture from accumulating and/or precipitating onto the flour; however, the heat treatment step may be conducted in an apparatus with or without such means for moisture removal. In one embodiment, the thermally inhibited apparatus is equipped with a means for removing water vapor from the apparatus. The dehydrating and heat treatment apparatus (singular or plural) can be any thermally controlled vessel and includes without limitation industrial ovens, such as conventional or microwave ovens, dextrinizers, fluidized bed reactors and driers, mixers, or blenders.

The time and temperature combination for the dehydration and heat treatment steps will depend upon the equipment used and may also be affected by the type of flour being treated, the pH and moisture content, and other factors identified and selected by the practitioner. By varying the process conditions, including the initial pH, the dehydrating method and conditions, and the heat treatment temperatures, times, and conditions, the level of inhibition can be varied to provide different viscosity characteristics in the final thermally inhibited flour. The conditions for obtaining a thermally inhibited flour for use in the present technology which are such that the granular structure of the starch is not destroyed (gelatinized), retaining their crystalline and birefringent properties. Further, there would be no loss of any Maltese cross present in the native starch when the granular structure is viewed under polarized light. Under some conditions, the starch granule may be partially swollen, but the crystallinity is not completely destroyed.

Although the crystallinity of the starch remains, the thermally inhibited processing changes other components of the flour, which may include structural changes. In one aspect, the conditions of the thermally inhibited are chosen to maximize the flour's efficacy in retorting, yet minimize the undesirable heat-induced effects, such as reduced nutritional value (e.g. degradation of vitamins) or reduced organoleptic qualities (e.g. undesirable taste, increased color). The flour may additionally be processed either before or after the thermally inhibited process, as long as such process does not destroy the granular structure of the starch. In one embodiment, such additional processing may include degradation using α-amylase or acid treatment and in another embodiment, chemical modification. In one embodiment, no chemical modification is conducted on the flour.

The particle size of the flour may be adjusted, either before or after thermally inhibited, for example by grinding, agglomerating, and/or sieving. In one embodiment, at least 90% of the thermally inhibited flour has a particle size of at least 250 microns and no greater than about 590 microns, and in another embodiment at least 90% of the thermally inhibited flour has a particle size of at least 180 microns and no greater than about 590 microns. In yet another embodiment, the thermally inhibited flour has a particle size of no greater than about 590 microns with 70% having a particle size of at least 180 microns and in a further embodiment the flour has a particle size of no greater than about 590 microns with 80% having a particle size of at least 125 microns. In all cases, the particle size of the thermally inhibited flour may be due to that of the flour before treatment or due to a change in particle size after treatment using methods known in the art. In one embodiment, the size after treatment is due to that of the flour before treatment. Any particle size adjustment must be done without gelatinizing the starch within the flour.

The flour may be purified to remove impurities, by-products, off-flavors, or colors by methods known in the art such as dialysis, filtration, ion exchange processes, or centrifugation. Such purification may be done on the base (native) flour or the thermally inhibited flours as long as the methodology does not adversely affect the resultant flour. In one embodiment, the flour is bleached using methods known in the art to reduce color. The pH of the flour may also be adjusted using methods known in the art. The pre- and/or post-processing methods used may further increase the efficacy of the flour in the retort process or otherwise make the flour more desirable for use in foods.

The resulting flour product which has been thermally inhibited will contain starch which has retained its granular structure as evidenced by its birefringent characteristic when viewed under the microscope and by no loss of any Maltese cross present in the native starch when viewed under polarized light. The starch of the flour will not be gelatinized. The resultant flour has an acceptable color with no or minimized deviation from the native flour. In one embodiment, the change in L-value in the Hunter Colorimeter test, which expresses whiteness on a scale from 0 to 100, between the native flour and the thermally inhibited flour is less than 10. In another embodiment, the change in L-value is less than 5 and in another embodiment the change in L-value is less than 2.

The resultant flours will provide opacity, mouth-coating properties, viscosity, and/or creaminess to the retorted products. The flour may be added as the sole viscosifier or additional viscosifiers may be added, such as gums and starches well known in the art for this purpose. In one aspect of the application, the flour is the only viscosifying agent added. The resultant starches may also have the added benefit of increasing the process tolerance of a food composition such that it's viscosity does not substantially change over time and in one embodiment the viscosity of the retorted product changes by less than 10% in twenty-four hours.

The resultant flours will have an increased efficacy in retorting, such that substitution of the flour for the same flour without thermal inhibition (e.g. untreated native flour) will decrease the retort time necessary to reach $F_0$ by at least 10%, in one embodiment, will decrease the retort time necessary to reach $F_0$ at least 20%, in another embodiment, will decrease the retort time necessary to reach $F_0$ by at least 30%, in another embodiment, will decrease the retort time necessary to reach $F_0$ by at least 40%, in yet another embodiment, will decrease the retort time necessary to reach $F_0$ by at least 50%, or by an amount in the range between and/or including any two of these values.

In another aspect of the application, the flour will have an increased efficacy in retorting, such that substitution of the thermally inhibited flour for the same or a comparable flour without thermal inhibition will decrease the amount of flour used by at least 5%, in one embodiment, will decrease the amount of flour by at least 10%, and in yet another embodiment, will decrease the amount of flour by at least 15% yet achieve the same viscosity at $F_0$. In still yet other embodiments, the reduction in the amount of flour needed due to the use of thermally inhibited flour while achieving the same viscosity at $F_0$ include but are not limited to 5%, 10%, 15%, 20%, 30%, 40%, 50%, or ranges between and including any two of these values. As used herein, the same viscosity includes that which is practically the same; i.e. there is no more than 50 Brabender units difference between the viscosities of the food products being compared.

The flour of this application may be used in any retorted food product. Typical retorted food products include, but are not limited to, soups, sauces and gravies, or beverages such as juices. Sauces and gravies include both those retorted as sauces and gravies and those retorted with other food products, for examples the sauce of baked beans and sauces or gravies used to prepare meals used for food-service or for packaged refrigerated or frozen meals. Food products also include those which may also be classified as pharmaceutical or nutritional products, such as diabetic foods and supplements, dietetic foods, foods to control glycemic response, foods for dysphagia, or sports drinks. In some embodiments, the retorted food product is a high-moisture food such as a liquid or semi-liquid.

The amount of flour which can be added and used in any given food will be determined to a great extent by the amount that can be tolerated by consumers of the food. In other words, the amount of flour used generally may be up to what is acceptable in organoleptic evaluation of the food. In one embodiment, the flour of this application is used in the same amount as the non-thermally inhibited flour (1:1 basis wt/wt), e.g., in the same amount as the native flour. In another embodiment, the flour of this application is used in an amount from about 0.1% to about 20%, by weight of the food. In another embodiment, the flour of this application is used in an amount from about 0.5% to about 16%, by weight of the food. In another embodiment, the flour of this application is used in an amount from about 1% to about 12%, by weight of the food.

The thermally inhibited flour may be used to partially or fully replace starch and/or flour in the retorted product. In one embodiment, the thermally inhibited flour is used to replace from about 10% to about 100% by weight of starch and/or flour conventionally used in the retorted food product. In another embodiment, the thermally inhibited flour is used to replace from about 25% to about 75% by weight of starch and/or flour conventionally used in the retorted food product. In another embodiment, the thermally inhibited flour is used to replace from about 40% to about 60% by weight of starch and/or flour conventionally used in the retorted food product. In one aspect of the application, the thermally inhibited flour is the only flour or starch added to the product prior to retorting the product.

The thermally inhibited flour can be used to partially or fully replace typical starches and flours at different ratios to achieve comparable viscosity in the retorted product. In one embodiment, a ratio of about 1:1 wt/wt of thermally inhibited flour to replace typical starches and flours may be used. In another embodiment, at least 0.2:1 (wt/wt) thermally inhibited flour is used to replace the conventional starch or flour (e.g., 0.2 g thermally inhibited flour is used to replace 1 g conventional starch or flour). In other embodiments, at least 0.3 to 1, at least 0.4:1, at least 0.5:1, at least 0.6:1, at least 0.7:1, at least 0.8:1, at least 0.9:1 or at least 0.95:1 (wt/wt) thermally inhibited flour is used to replace the conventional starch or flour. In yet another embodiment, no more than 3:1 (wt/wt) thermally inhibited flour is used to replace the conventional starch or flour. The products made using the flours of this application may be fed to (ingested by) any animal and in one embodiment to mammals and in another embodiment to humans.

DEFINITIONS

The following definitions are used in connection with the compounds of the present application unless the context indicates otherwise. The acronym TI means thermally inhibited. The acronym APF means all purpose flour.

As used herein, the phrase, "commercially sterile" means acceptable for commercial sale and is intended to include destruction of *Clostridium botulinum*. In one embodiment, "commercially sterile" would also include inactivation of other pathogenic and/or spoilage microorganisms such as those which may cause health hazards, spoilage and/or decomposition.

As used herein, "flour" is intended to mean a multicomponent composition which includes starch and may include protein, fat (lipids), fiber, vitamins and/or minerals. Flour is intended to include, without limitation, meal, whole meal, cone, masa, grits, or flaking grits, but is not intended to include pure starch extracted, e.g. from a flour, through removal of other components such as those described above.

As used herein the phrases, a "fluidized reactor", "fluidized drier", "fluidized mixer" "fluidized bed reactor", "fluidized bed drier", or "fluidized bed mixer" are intended to mean any apparatus in which the flour is substantially fluidized, whether by gas, mechanical or other means.

As used herein, "gelatinization" is intended to mean the process by which starch is cooked out and loses its granular structure. During "gelatinization", as used herein, starch loses its birefringent property as well as any Maltese cross present in its native state.

As used herein, "granular" is intended to mean the structure of native starch in which the starch is not water soluble (still at least partly crystalline) and exhibits birefringence and a typical Maltese cross under polarized light. In high amylose starches, some native granules do not exhibit a Maltese cross, particularly filamentous granules.

As used herein, "heating time" is the time at the target temperature and does not include heat-up (ramping) time.

As used herein, "heat-up time" or "ramping time" is intended to mean the time required to heat the flour from room temperature to target temperature.

As used herein, the term "high amylose flour" is intended to include flour whose starch contains at least 27% amylose for wheat or rice flour and at least 50% amylose for other sources. In one embodiment, the flour from other sources contains at least 70% amylose. In one embodiment, the flour from other sources contains at least 80% amylose by weight. In one embodiment, the flour from other sources contains at least 90% amylose by weight. The percent amylose (and therefore amylopectin) is determined by using the potentiometric method.

A starch or flour is referred to as "inhibited" if these inhibited starches or flours when dispersed and/or cooked in water exhibit the textural and viscosity properties characteristic of a chemically-cross-linked starch or flour. The starch granules are more resistant to viscosity breakdown. This resistance to breakdown results in what is subjectively considered a non-cohesive or "short" textured paste, meaning that the gelatinized starch or flour tends to be salve-like and heavy in viscosity rather than runny or gummy. The non-pregelatinized thermally inhibited granular starches or flours exhibit an unchanged or reduced gelatinization temperature. In contrast, most annealed and heat/moisture treated starches or flours show an increased gelatinization temperature. Chemically cross-linked starch or flours show an unchanged gelatinization temperature. It is believed the overall granular structure of the starch in the thermally inhibited starch or flour has been altered. The starches that are substantially completely thermally inhibited will resist gelatinization. The starches that are highly inhibited will gelatinize to a limited extent and show a continuing rise in viscosity but will not attain a peak viscosity. The starches that are moderately inhibited will exhibit a lower peak viscosity and a lower percentage breakdown in viscosity compared to the same starch that is not inhibited. The starches that are lightly inhibited will show a slight increase in peak viscosity and a lower percentage breakdown in viscosity compared to the same starch that is not inhibited. For non-pregelatinized thermally inhibited starches, the Brabender viscosity initializes (starts to build) at an earlier or substantially the same time as the same starch which has not been thermally inhibited. In addition, the thermally inhibited starches will have less viscosity breakdown than the same starch which has not been thermally inhibited.

Starch or flour inhibition may be characterized by Brabender curves. For a highly inhibited starch or flour, the Brabender curve will be flat, indicating that the starch or flour is so inhibited that it is resisting any further gelatinization or the curve will be a rising Brabender curve, indicating that further gelatinization is occurring at a slow rate and to a limited extent. For a less inhibited starch or flour, the Brabender curve will show a dropping curve, but the overall breakdown in viscosity from the peak viscosity will be lower than that for a non-inhibited starch or flour. Thermally inhibited starches and methods for making them are known and described in U.S. Pat. No. 5,725,676, 5,932, 01, or 6,231,675.

As used herein, the phrases "low amylose flour", "high amylopectin flour" or "waxy flour" are intended to mean flour whose starch containing less than 10% amylose by weight, in one embodiment less than 5% amylose by weight, in another embodiment less than 2% amylose by weight, and in yet another embodiment less than 1% amylose by weight of the starch.

As used herein, the term "native flour" is derived from a plant as it is found in nature.

As used herein, the phrase "processing medium" or "processing media" is intended to include any fluid in which the retorting is accomplished and includes without limitation saturated steam, air, steam, water, or any combinations thereof.

As used herein, the phrase "retort equipment" is intended to mean any type of equipment in which the retort process may be conducted and includes, without limitation, static retorts, agitating retorts, rotational retorts, or hydrostatic retorts.

As used herein, the phrase "retorted food product" is intended to mean any food which undergoes a retort process known in the art. Typical "retorted food products" include, but are not limited to, soups, sauces and gravies, or beverages such as juices. Sauces and gravies include both those retorted as sauces and gravies and those retorted with other food products, for examples the sauce of baked beans and sauces/gravies used to prepare meals used for food-service or for packaged refrigerated or frozen meals.

As used herein, the phrase "retort process" is intended to mean a process in which the food medium is exposed to heat in a sealed container to render it commercially sterile. Retorting includes such process in any sealed container, including without limitation a can, pouch or jar of any material including without limitation glass and metals.

As used herein, the phrase "retort temperature" can be in any range that is suitable to safely process the materials of interest. Without being limiting in any way, the temperatures can be in a range from about 90° C. to about 150° C.

As used herein, the phrase "structural change" is intended to mean change to any native structure of the flour components, and includes without limitation protein denaturation, starch annealing or crystallization, or formation of complexes or other interactions between the flour components.

As used herein, the phrase "target temperature" is intended to mean the temperature at which the flour is heat treated and in one embodiment begins when the flour reaches a temperature of about 100° C.

As used herein, the phrase "thermally inhibited flour" is intended to mean dehydrating a flour to a moisture content of less than about 5% by weight, and heat treating the dehydrated flour using methods known in the art at a target temperature of from 100° C. to 180° C. for up to 2 hours at a pH of at least 4.5 using conditions which will not gelatinize or destroy the granular nature of, the starch within the flour. Further, in some embodiments, thermally inhibition increases the resistance of flour to subsequent cook and retort processes in the preparation of retorted food product.

Certain specific aspects and embodiments of the present application will be explained in greater detail with reference to the following examples, which are provided only for purposes of illustration and should not be construed as limiting the scope of the application in any manner. Reasonable variations of the described procedures are intended to be within the scope of the present invention. While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

EXAMPLES

All parts and percentages are given by weight and all temperatures in degrees Celsius (° C.) unless otherwise noted. The following analytical procedures were used throughout the examples.

Amylose Content by Potentiometric Titration.

A 0.5 g portion of starch (1.0 g of ground grain) sample was heated in 10 mL of concentrated calcium chloride (about 30% by weight) to 95° C. for 30 minutes. The sample was cooled to room temperature, diluted with 5 mL of a 2.5% uranyl acetate solution, mixed well, and centrifuged for 5 minutes at 2000 rpm. The sample was then filtered to give a clear solution. The starch concentration of the sample was determined polarimetrically in a 1 cm polarimetric cell using standard procedures. An aliquot of the sample (normally 5 mL) was then directly titrated with a standardized 0.01 N iodine solution while recording the potential using a platinum electrode with a KCl reference electrode. The amount of iodine needed to reach the inflection point was measured directly as bound iodine. The amount of amylose was calculated by assuming 1.0 gram of amylose will bind with 200 milligrams of iodine.

Pre-Cook Procedure.

The dry ingredients were slurried into water and/or wet ingredients, as appropriate. The slurry was heated in boiling water bath with stirring to the desired temperature and held for desired time. The heated slurry was filled into 10 oz. cans and sealed.

Retort Procedure.

The cans were placed into a Stock 900 Pilot Retort Full Water Immersion Retort rotary at 121° C. (250° F.) for 40 minutes. The $F_0$ data was collected using Ellab Software.

Viscosity Evaluation Procedure.

The viscosity and appearance of samples were assessed as follows: (i) Brookfield Viscosity a Model DV-II+ Brookfield apparatus with the parameters: "B" t-bar (#92), heliopath off, 30 second measurement in centipoise at 10 rpm was used. The apparatus was turned on, the viscosity was determined prior to filling cans and after retorting (cps). (ii) Visual the sample was stirred 4 times with a spoon to feel the viscosity. The spoon was lifted from the sample and the flow off spoon was observed. The surface and clarity were examined.

Procedure for Preparing Flour in Water Cooks.

Cook Procedure: the starch and flour were weighed and dry blend together. The water and/or wet ingredients were weighed into a beaker. The starch and flour blend were added into the water and/or wet ingredients with stirring. The resulting slurry was heated in a boiling water bath with continual stirring to the temperature and hold times indicated in table below. A 300 g sample of the starch cook was filled into 10 oz. cans with and the cans sealed. Retort Procedure: the cans were placed into a Stock 900 Pilot Retort Full Water Immersion apparatus and retorted at 121° C. for 40 minutes. The $F_0$ data was collected using Ellab Software.

Procedure for Preparing Cream of Chicken Soups:

Cook Procedure: the flour, starch, salt, sugar, MSG, and poultry seasoning were weighed and blend together. The water, whipping cream, and oil were weighed into a beaker. The dry ingredients blend was added into the water, cream, and oil mixture with stirring. The butter was melted and added to the beaker. The mixture was heated in a boiling water bath with continual stirring until temperature reaches 90° C. A 300 g sample of the soup mixture was filled into 10 oz cans, which were sealed. Retort Procedure: The cans were placed in Stock 900 Pilot Retort Full Water Immersion and retorted statically at 121° C. for 60 minutes. The $F_0$ data was collected using Ellab Software.

Thermal Analysis by DSC.

Thermal Analysis of the Native and Hydro-Thermally treated flours was performed using a Perkin Elmer Differential Scanning calorimeter 7 with liquid nitrogen cooling accessory. A 10 mg anhydrous sample is weighed into a stainless steel hermetic pan and water is added to obtain 3:1 water to flour ratio. The pan is sealed and scanned from 10° C.-160° C. at 10° C./min heating rate. The sample is run in duplicates and the average values of onset, peak and end melting temperatures (° C.), and gelatinization enthalpy values (J/g) is determined.

Materials and Methods.

TI 1 flour, a commercial functional wheat flour which is thermally inhibited and has process tolerance and TI 2 flour another wheat flour which is thermally inhibited were used. The all purpose flour was a standard wheat flour from the grocery store. The modified corn starch was a hydroxypropyl distarch phosphate made from waxy corn.

Examples 1 and 2

Starch and Flour in Water Cooks

Table 1 shows the results of the above cook procedures as applied to flour mixtures with and without thermally inhibited flour. In each case, addition of thermally inhibited flour reduced $F_0$ and increased viscosity compared to non-thermally inhibited flour.

TABLE 1

| exam No. | flour type | % flour | cook temp (° C.) | hold time (min.) | time to $F_0$ = 10 (min.) | pre retort viscosity | post retort viscosity | visual evaluation |
| --- | --- | --- | --- | --- | --- | --- | --- | --- |
| 1A | all purpose flour | 6 | 85 | 20 | 51 | 9680 | 3200 | Thin - Moderate Viscosity, Runny, Opaque |
| 1B | TI flour 1 | 6 | 85 | 20 | 33 | 24040 | 10440 | Moderate viscosity, Smooth |
| 1C | TI flour 2 | 6 | 85 | 20 | 27 | 14400 | 8640 | Moderate viscosity, Smooth |
| 2A | all purpose flour | 6 | 90 | 20 | 51 | 8600 | 3600 | Thin - Moderate Viscosity, Runny, Opaque |
| 2B | TI flour 1 | 6 | 90 | 20 | 28 | 22040 | 9840 | Moderate viscosity, Smooth |
| 2C | TI flour 2 | 6 | 90 | 20 | 25 | 18240 | 7840 | Moderate viscosity, Smooth |

Example 3

Cream of Chicken Soup

Cream of chicken soup was prepared according to the Procedure for Preparing Cream of Chicken Soups above, using the ingredients shown in Table 2. Table 3 shows the conditions and results for this preparation. Again, $F_0$ was reduced. Viscosity, while somewhat lower was still comparable to the cream of chicken soup prepared with non-thermally inhibited flour.

TABLE 2

| Ingredient | % |
| --- | --- |
| chicken broth | 4.54 |
| butter | 1.95 |
| corn oil | 0.65 |
| heavy whipping cream | 5.2 |
| nonfat dry milk (Hi Heat) | 0.65 |
| flour | 5.15 |
| modified corn starch. | 3.09 |
| salt | 1.95 |
| sugar | 0.16 |
| monosodium glutamate | 0.33 |
| poultry seasoning | 0.4 |
| water | 75.93 |

TABLE 3

| exam No. | flour type | % flour | cook temp (° C.) | hold time (min) | time to $F_0 = 10$ (min.) | pre retort viscosity | post retort viscosity | visual evaluation |
| --- | --- | --- | --- | --- | --- | --- | --- | --- |
| 3A | all purpose flour | 5.15 | 90 | 0 | 49 | 33300 | 14900 | Thick, Smooth, Opaque |
| 3B | TI 1 wheat flour | 5.15 | 90 | 0 | 28 | 29040 | 9720 | Moderate Viscosity, Smooth |
| 3C | TI 2 wheat flour | 5.15 | 90 | 0 | 30 | 28280 | 7120 | Moderate Viscosity, Smooth |

Throughout this application, various publications are referenced. The disclosures of these publications in their entireties are hereby incorporated by reference into this application in order to more fully describe the state of the art as known to those skilled therein as of the date of the application described and claimed herein.

While particular embodiments of the present application have been illustrated and described, it would be obvious to those skilled in the art that various other changes and modifications can be made without departing from the spirit and scope of the application. It is therefore intended to cover in the appended claims all such changes and modifications that are within the scope of this application.

The invention claimed is:

1. A process of making a retorted food product to increase the retort efficiency comprising:
   a portion of a base flour that has not been thermally inhibited;
   a portion of the base flour that is thermally inhibited;
   a) substituting between about 25% and about 75% by weight of the portion of the base flour that has not been thermally inhibited with the portion of the portion of base flour that is thermally inhibited in a food product;
   wherein the food product comprises:
   a) at least 5 wt% less of the portion of the base flour that is thermally inhibited than the portion of the base flour that is not thermally inhibited;
   b) retorting the food product for a time of from between about 15 minutes to about 80 minutes to make a retorted food product having a $F_0$ value of at least 10 and a viscosity of a retorted test food product, thereby increasing the efficiency of the retort process; and
   said retorted test food product comprise:
   the base flour; and
   no thermally inhibited flour.

2. The process of claim 1, wherein the amount of the portion of the base flour that is thermally inhibited flour used in the retorted food product is at least 10%, by weight, less than the amount of the portion of the base flour that has not been thermally inhibited.

3. The process of claim 2, wherein the amount of the portion of the base flour that is thermally inhibited flour used in the retorted food product is at least 15%, by weight less, than the amount of the portion of the base flour that has not been thermally inhibited.

4. The process of claim 1, wherein the food product is retorted from between about 50 minutes to about 70 minutes.

5. The process of claim 1, wherein the thermally inhibited flour comprises from about 0.1 wt% to about 20 wt% of the total weight of the retorted food product.

6. The process of claim 5, wherein the thermally inhibited flour comprises from about 5% wt% to about 7% wt% of the total weight of the retorted food product.

7. The process of claim 1, wherein the retorting time of the retorted food product is at least 20% less than the time required to achieve the $F_0$ value of at least 10 and the viscosity of the retorted test food product.

8. The process of claim 7, wherein the retorting time of the retorted food product is at least 30% less than the time required to achieve the $F_0$ value of at least 10 and the viscosity of the retorted test food product.

9. The process of claim 1 wherein the substituting of the portion of the base flour that has not been thermally inhibited with the portion of the base flour that is thermally inhibited, in a food product, is between about 40% and about 60%, by weight.

* * * * *